UNITED STATES PATENT OFFICE.

GUSTAV MOLT, OF MILLBURY, MASSACHUSETTS.

IMPROVEMENT IN DYEING WITH INDIGO.

Specification forming part of Letters Patent No. 150,427, dated May 5, 1874; application filed September 27, 1873.

*To all whom it may concern:*

Be it known that I, GUSTAV MOLT, of Millbury, in the county of Worcester, State of Massachusetts, have invented certain Improvements in Process for Coloring Wool and Cotton, of which the following is a specification:

My invention relates to the coloring of wool and cotton by indigo in a process in which other things are used to economize and facilitate the process and leave the fabric in better condition. Its nature consists in making a solution of indigo with caustic soda and muriate of tin, and regulating or adjusting the condition of this solution by means of a decoction or extract of hops and sugar in water, according to the work, as hereinafter described.

First, I make a solution by dissolving in water as many pounds of caustic soda as I intend to use of indigo; then dissolve one-half as much of muriate-of-tin crystals in water, and dissolve soda-ash (equal in weight to the caustic soda) in water in a separate vessel, and add it slowly to the solution of tin until effervescence ceases; to this add cold water, and let it stand until settled; then pouring off the clear part reserve the precipitate and thick portion, to which I add the solution of caustic soda, and add the ground indigo, and raise its temperature to 160° Fahrenheit, making a solution of indigo.

I also make an extract or decoction of hops to use with the above, of the proportion of two pounds of hops to every fifteen pounds of indigo used, and boil the hops in water with fifteen pounds of sugar, (to two of hops,) using molasses-sugar or any cheap sugar, and then straining out the hop leaves. I put this and the solution of indigo together, and heat to 130° Fahrenheit over night, to be used the next day, and keep at that or about that temperature when using.

In operation, the addition of the hops and sugar prevents the precipitation of the indigo while at work, keeping it up in solution ready for use, thus saving the waste of coloring matter; and it also prevents the fabric from becoming harsh and stiff by the action of the soda, and keeps it in a soft and elastic condition.

I claim—

The coloring process described, consisting in the application of a solution of indigo and the extract or decoction of hops, substantially as set forth.

GUSTAV MOLT.

Witnesses:
 GEO. MORSE,
 DANL. SWEET.